United States Patent
Armangau et al.

(10) Patent No.: US 9,880,762 B1
(45) Date of Patent: Jan. 30, 2018

(54) COMPRESSING METADATA BLOCKS PRIOR TO WRITING THE METADATA BLOCKS OUT TO SECONDARY STORAGE

(71) Applicant: EMC IP Holding Company LLC, Hopkinton, MA (US)

(72) Inventors: Philippe Armangau, Acton, MA (US); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 14/984,063

(22) Filed: Dec. 30, 2015

(51) Int. Cl.
*G06F 3/06* (2006.01)

(52) U.S. Cl.
CPC ............ *G06F 3/0619* (2013.01); *G06F 3/065* (2013.01); *G06F 3/0643* (2013.01); *G06F 3/0685* (2013.01)

(58) Field of Classification Search
CPC ...... G06F 3/0619; G06F 3/0643; G06F 3/065; G06F 3/0685; G06F 2212/466
USPC ......................................... 711/118, 135, 162
See application file for complete search history.

(56) References Cited

U.S. PATENT DOCUMENTS

| | | | |
|---|---|---|---|
| 2008/0162523 A1* | 7/2008 | Kraus | G06F 17/30339 |
| 2013/0246568 A1 | 9/2013 | Chesterfield | |
| 2015/0112938 A1* | 4/2015 | Swift | H04L 67/1095 707/639 |
| 2015/0193353 A1* | 7/2015 | Habermann | G06F 12/0897 711/122 |
| 2015/0293984 A1 | 10/2015 | Zolotusky, Jr. et al. | |
| 2016/0004715 A1 | 1/2016 | Amit et al. | |
| 2016/0041778 A1 | 2/2016 | Li et al. | |
| 2016/0042090 A1 | 2/2016 | Mitkar et al. | |
| 2016/0364180 A1* | 12/2016 | Romanovskiy | G06F 12/0246 |

* cited by examiner

*Primary Examiner* — Gary Portka
(74) *Attorney, Agent, or Firm* — BainwoodHuang

(57) ABSTRACT

A technique manages file system metadata and is performed in a data storage system that maintains a file system on behalf of a set of host computers. The technique involves modifying a first metadata block of the file system in response to a file system change, the first metadata block containing file system metadata. The technique further involves performing a compression operation to generate a compressed metadata block in volatile storage from the first metadata block, the compressed metadata block having a size that is smaller than a size of the first metadata block. The technique further involves writing the compressed metadata block from the volatile storage (volatile cache memory) to non-volatile storage (e.g., flash memory).

17 Claims, 5 Drawing Sheets

COMPRESSING METADATA BLOCKS PRIOR TO WRITING THE METADATA BLOCKS OUT TO SECONDARY STORAGE

BACKGROUND

Conventional data storage arrays store host information on behalf of host computers. Some data storage arrays store data in file systems, i.e., hierarchical structures of directories, subdirectories, and files.

When there is change to a file on a data storage array (e.g., when data is added to a file), the array may update portions of an inode structure which identifies particular details of that file. For example, the array may update (i) an indirect block (IB) which stores addresses of blocks containing the data and (ii) block metadata (BMD) which stores a checksum of that IB. When the IB and BMD are later retrieved from secondary storage in order to locate the data of that file, the contents of the IB are evaluated against the checksum stored in the BMD to verify that the contents of the IB are good, i.e., to confirm that the contents of the IB are not corrupted.

SUMMARY

Unfortunately, there are deficiencies to the above described conventional data storage array which updates block metadata (BMDs) with checksums of indirect blocks (IBs) in response to file system changes. Along these lines, updating BMDs with checksums consumes computerized resources, e.g., bus resources, cache space, locks, etc. that are involved in reading the BMDs from secondary storage, updating the BMDs with checksums, and writing the updated BMDs back to secondary storage. Additionally, even a pure read operation requires reading of a BMD and checksum evaluation to confirm that the contents of an associated IB are not corrupted. Furthermore, if the BMDs are stored in flash memory, such operation provides additional wear on the flash memory (i.e., writing BMDs as well as IBs where such operation consumes a finite number of program-erase cycles of the flash memory).

In contrast to the above-described conventional data storage array which updates BMDs with checksums of IBs in response to file system changes, improved techniques are directed to compressing metadata blocks prior to writing the metadata blocks out to secondary storage in response to file system changes. Such techniques alleviate the need to store checksums in BMDs since verification of metadata block contents can be taken care of during decompression (i.e., confirmation of correct decompression further indicates that the metadata block contents are intact/good). Accordingly, there are less computerized resources consumed and less wear of flash memory if the compressed metadata blocks are written to the flash memory.

One embodiment is directed to a method of managing file system metadata which is performed in a data storage system that maintains a file system on behalf of a set of host computers. The method includes modifying a first metadata block of the file system in response to a file system change, the first metadata block containing file system metadata. The method includes performing a compression operation to generate a compressed metadata block in volatile storage from the first metadata block, the compressed metadata block having a size that is smaller than a size of the first metadata block. The method further includes writing the compressed metadata block from the volatile storage to non-volatile storage.

In some arrangements, the method further includes reading the compressed metadata block from the non-volatile storage, and performing a decompression operation to generate a decompressed metadata block from the compressed metadata block. The decompressed metadata block has a size that is larger than the size of the compressed metadata block.

In some arrangements, the method further includes analyzing a result of the decompression operation to verify that contents of the decompressed metadata block are valid. Such operation alleviates the need for storing, in a separate block, a checksum for the metadata.

In some arrangements, modifying the first metadata block includes entering the first metadata block into a metadata transaction log from which dirty metadata blocks are periodically flushed to the non-volatile storage. In these arrangements, performing the compression operation to generate the compressed metadata block in the volatile storage from the first metadata block may include, as part of a flush operation which flushes dirty metadata blocks of the metadata transaction log to the non-volatile storage, applying a compression algorithm to the first metadata block to form the compressed metadata block.

In some arrangements, the first metadata block is an indirect block (IB) of an inode structure of the file system, and the IB has a respective metadata block (BMD) containing additional metadata. In these arrangements, entering the first metadata block into the metadata transaction log includes adding the IB to the metadata transaction log without updating the BMD of the IB and without adding the BMD of the IB to the metadata transaction log.

In some arrangements, the IB is 8 KB in size and the compressed metadata block is 4 KB in size. In these arrangements, if compression of the metadata block results in a significantly smaller size (e.g., 2 KB), the metadata block can be padded (e.g., zeroed out) to 4 KB to prevent triggering excessive garbage collection (i.e., coalescing small amounts of data into fewer extents to free extents for reuse due to underutilization of the extents).

In some arrangements, the flush operation (i) coalesces the IB with other compressed metadata blocks into an extent for synchronization to flash memory and (ii) writes the extent to the flash memory.

In some arrangements, the metadata transaction log resides in first volatile cache memory. In these arrangements, adding the IB to the metadata transaction log includes placing the IB in the metadata transaction log residing in the first volatile cache memory and placing a copy of the IB in second volatile cache memory which mirrors the first volatile cache memory.

In some arrangements, writing the compressed metadata block from the volatile storage to the non-volatile storage includes writing a particular extent to the non-volatile storage, the extent including the IB. In these arrangements, the method further includes, in response to another file system change, reading a group of extents from the non-volatile storage, the group of extents including the particular extent; and performing an XOR operation on the group of extents to determine whether the IB was involved in a lost write operation.

Another embodiment is directed to data storage equipment that maintains a file system on behalf of a set of host computers. The data storage equipment includes a communications interface which is constructed and arrange to communicate with the set of host computers, memory which includes volatile storage and non-volatile storage, and control circuitry coupled to the communications interface and the memory. The memory stores instructions which, when carried out by the control circuitry, cause the control circuitry to:

(A) modify a first metadata block of the file system in response to a file system change, the first metadata block containing file system metadata, (B) perform a compression operation to generate a compressed metadata block in the volatile storage from the first metadata block, the compressed metadata block having a size that is smaller than a size of the first metadata block, and (C) write the compressed metadata block from the volatile storage to the non-volatile storage.

Yet another embodiment is directed to a computer program product having a non-transitory computer readable medium which stores a set of instructions to manage file system metadata in a data storage system that maintains a file system on behalf of a set of host computers. The set of instructions, when carried out by computerized circuitry, causes the computerized circuitry to perform a method of:

(A) modifying a first metadata block of the file system in response to a file system change, the first metadata block containing file system metadata;

(B) performing a compression operation to generate a compressed metadata block in volatile storage from the first metadata block, the compressed metadata block having a size that is smaller than a size of the first metadata block; and (C) writing the compressed metadata block from the volatile storage to non-volatile storage.

It should be understood that, in the cloud context, at least some of electronic circuitry is formed by remote computer resources distributed over a network. Such an electronic environment is capable of providing certain advantages such as high availability and data protection, transparent operation and enhanced security, big data analytics, etc.

Other embodiments are directed to electronic systems and apparatus, processing circuits, computer program products, and so on. Some embodiments are directed to various methods, electronic components and circuitry which are involved in compressing metadata blocks prior to writing the metadata blocks out to secondary storage.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to compressing metadata blocks prior to writing the metadata blocks out to secondary storage when updating a file system with changes. Such techniques alleviate the need to store checksums in block metadata (BMDs) since verification of metadata block contents can be taken care of during decompression (i.e., confirmation of correct decompression further indicates that the metadata block contents are intact/good). As a result, there are less computerized resources consumed when updating the file system with changes and when locating data, and less wear of flash memory.

Figure 1:
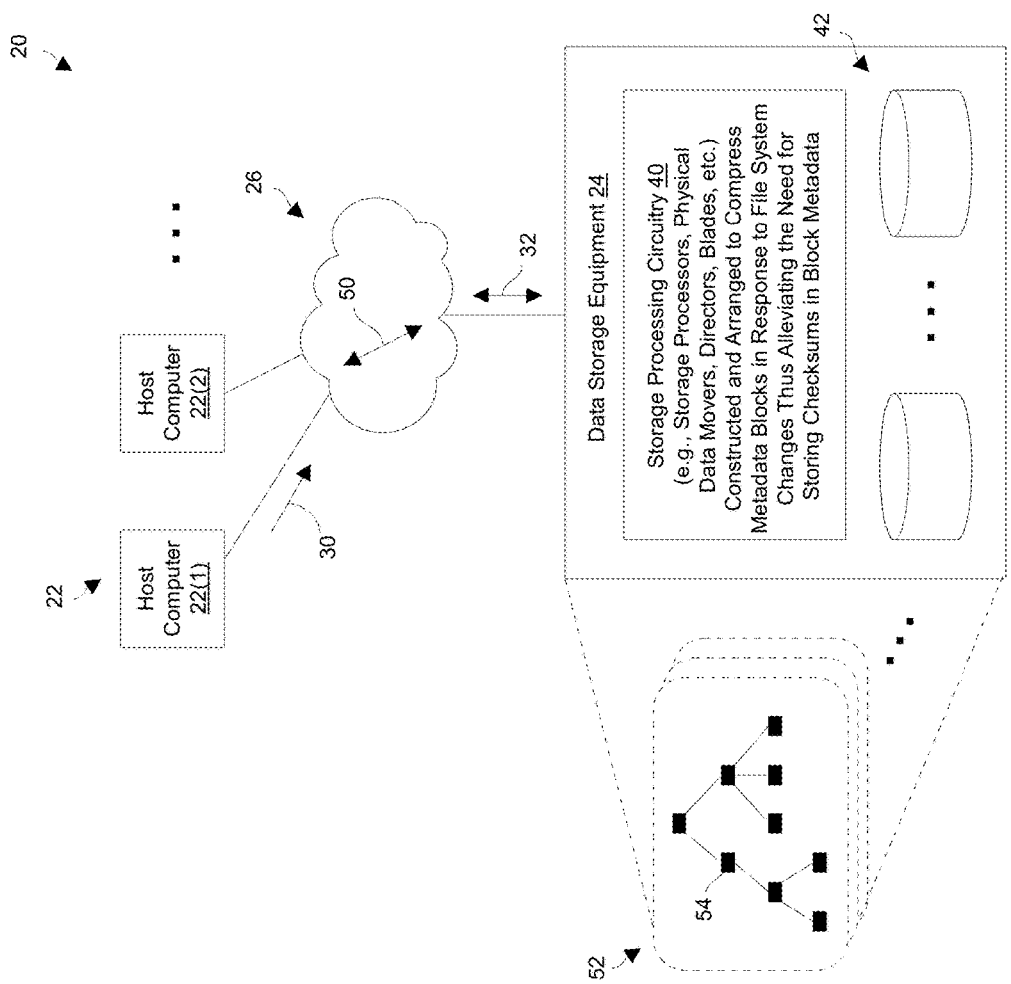
FIG. 1 is a block diagram of a data storage environment which utilizes compression of metadata blocks prior to writing the metadata blocks out to secondary storage.

FIG. 1 is a block diagram of a data storage environment 20 which utilizes compression of metadata blocks prior to writing the metadata blocks out to secondary storage. The data storage environment 20 includes host computers 22(1), 22(2), . . . (collectively, host computers 22), data storage equipment 24, and a communications medium 26.

Each host computer 22 is constructed and arranged to perform useful work. For example, a host computer 22 may operate as a file server, a web server, an email server, an enterprise server, and so on, which provides I/O requests 30 (e.g., file-based commands, small computer system interface or SCSI commands, etc.) to the data storage equipment 24 to store host information 32 in and read host information 32 from the data storage equipment 24.

The data storage equipment 24 includes storage processing circuitry 40 and a set of storage devices 42. The storage processing circuitry 40 may include one or more physical storage processors, data mover circuits, director boards, blades, I/O modules, storage drive controllers, switches, combinations thereof, and so on. The storage processing circuitry 40 is constructed and arranged to process the I/O requests 30 from the host computers 22 by robustly and reliably storing the host information 32 in the set of storage devices 42 and retrieving the host information 32 from the set of storage devices 42. As will be explained in further detail shortly, the storage processing circuitry 40 uses compression and decompression when accessing metadata blocks on secondary storage (e.g., see the set of storage devices 42). Such operation leverages off of built-in error detection/correction features of the compression/decompression activity and thus alleviates the need to store checksums in BMDs thus minimizing consumption of resources, and reducing flash memory wear.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

During operation, the data storage equipment 24 stores data (e.g., host information 32, configuration data, operating parameters, etc.) in a set of file systems 52, i.e., files 54 organized hierarchically. As the file systems 52 undergo changes, the data storage equipment 24 updates inode structures which store information about the various files 54 of the file systems 52 (e.g., file types, block addresses, privileges, and so on). During such operation, the storage processing circuitry 40 compresses metadata blocks (e.g., inodes, indirect blocks or IBs, BMDs, virtual block maps or VBMs assuming that VBMs are deployed, etc.) of the file systems 52 prior to storing the metadata blocks in the secondary storage 42 (i.e., non-volatile memory). Additionally, the storage processing circuitry 40 decompresses the metadata blocks when retrieving the metadata blocks from secondary storage 42.

It should be understood that such compression and decompression is accompanied by built-in error detection and/or correction safeguards that enable the storage processing circuitry 40 to determine whether the data has remained intact or whether the data has been corrupted. With such error checking in place, the data storage equipment 24 does not require storage of IB checksums in their associated BMDs. Accordingly, there are less computerized resources consumed when saving IBs out to the secondary storage 42 (i.e., less need to update or read the associated BMDs which would otherwise consume cache space, bus bandwidth, etc.). Moreover, if the metadata is stored in flash memory (for fast access), wear on the flash memory is minimized (i.e., storage of compressed metadata rather than non-compressed metadata, less need to update/store associated BMDs, etc.). Further details will now be provided with reference to FIG. 2.

Figure 2:
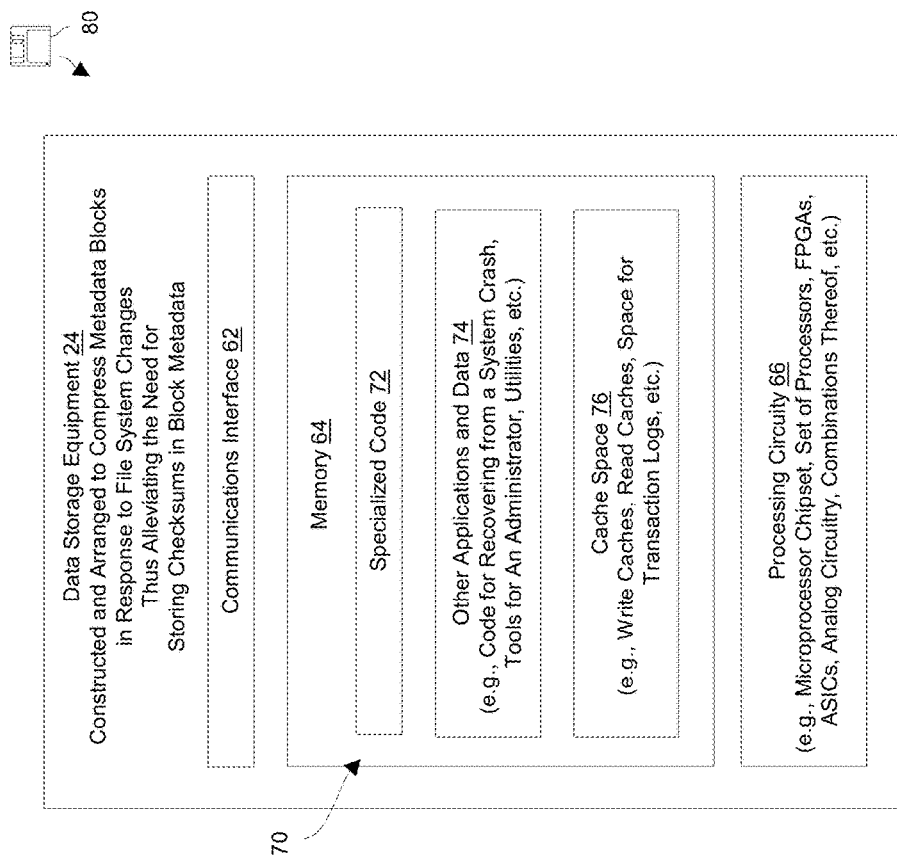
FIG. 2 is a block diagram of an electronic apparatus of the data storage environment of FIG. 1.

FIG. 2 is a block diagram of the data storage equipment 24 of FIG. 1. The data storage equipment 24 includes a communications interface 62, memory 64, and processing circuitry 66.

The communications interface 62 is constructed and arranged to connect the data storage equipment 24 to the communications medium 26 (also see FIG. 1) to enable communications with other devices of the data storage environment 20 (e.g., see the host computers 22). Such communications may be IP-based, SAN-based, cellular-based, cable-based, fiber-optic based, wireless, cloud-based, combinations thereof, and so on. Accordingly, the communications interface 62 enables the data storage equipment 24 to robustly and reliably communicate with other external apparatus.

The memory 64 is intended to represent both volatile storage (e.g., DRAM, SRAM, etc.) and non-volatile storage (e.g., flash memory, magnetic memory, etc., also see the secondary storage 42 in FIG. 1). The memory 64 stores a variety of software constructs 70 including specialized code 72, other applications and data 74, and dedicated cache space 76. The specialized code 72 is intended to refer to operating system and control instructions such as a kernel to manage computerized resources (e.g., processor cycles, memory space, etc.), drivers (e.g., an I/O stack), as well as the various structures that the operating system manages to move data (e.g., transaction logs, dirty block lists, address mappings, etc.). The other applications and data 74 include applications and routines to provide ancillary and background services (e.g., code to handle recovery from a system crash, etc.), user-level applications, administrative tools, utilities, and so on. The cache space 76 provides finite amounts of memory for carrying out various data storage operations, e.g., write caches, read caches, space for transaction logs, etc.

The processing circuitry 66 is constructed and arranged to operate in accordance with the various software constructs 70 stored in the memory 64. As will be explained in further detail shortly, the processing circuitry 66 executes the specialized code 72 to form specialized circuitry which responds to I/O requests 30 (e.g., read and write commands). Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the data storage equipment 24. In particular, the computer program product 80 has a non-transitory (or non-volatile) computer readable medium which stores a set of instructions which controls one or more operations of the data storage equipment 24. Examples of suitable computer readable storage media include tangible articles of manufacture and apparatus which store instructions in a non-volatile manner such as CD-ROM, flash memory, disk memory, tape memory, and the like.

During operation, the data storage equipment 24 maintains and manages a set of file systems 52 in the process of responding to I/O requests 30 from one or more host computers 22 (FIG. 1). As changes to a file system 52 occur (e.g., when a host computer 22 adds host information 32 to a file 54, when the operating system performs internal operations, etc.), the specialized circuitry formed by the processing circuitry 66 executing the specialized code 72 places metadata block entries in a metadata transaction log to record all of the completed operations (also see the cache space 76). The specialized circuitry then periodically flushes these entries from the metadata transaction log to the secondary storage 42 to free space in the metadata transaction log (e.g., every 30 seconds, every minute, every two minutes, etc.).

The metadata transaction log is persisted in memory (e.g., via battery backup) as well as copied (e.g., mirrored to another cache). Accordingly, if the data storage equipment 24 suffers a crash, the safeguarded contents of the metadata transaction log remain available as a record of completed operations. As a result, the data storage equipment 24 can reboot and playback the entries of the metadata transaction log to recover the file system to a consistent state. Further details will now be provided with reference to FIG. 3.

Figure 3:
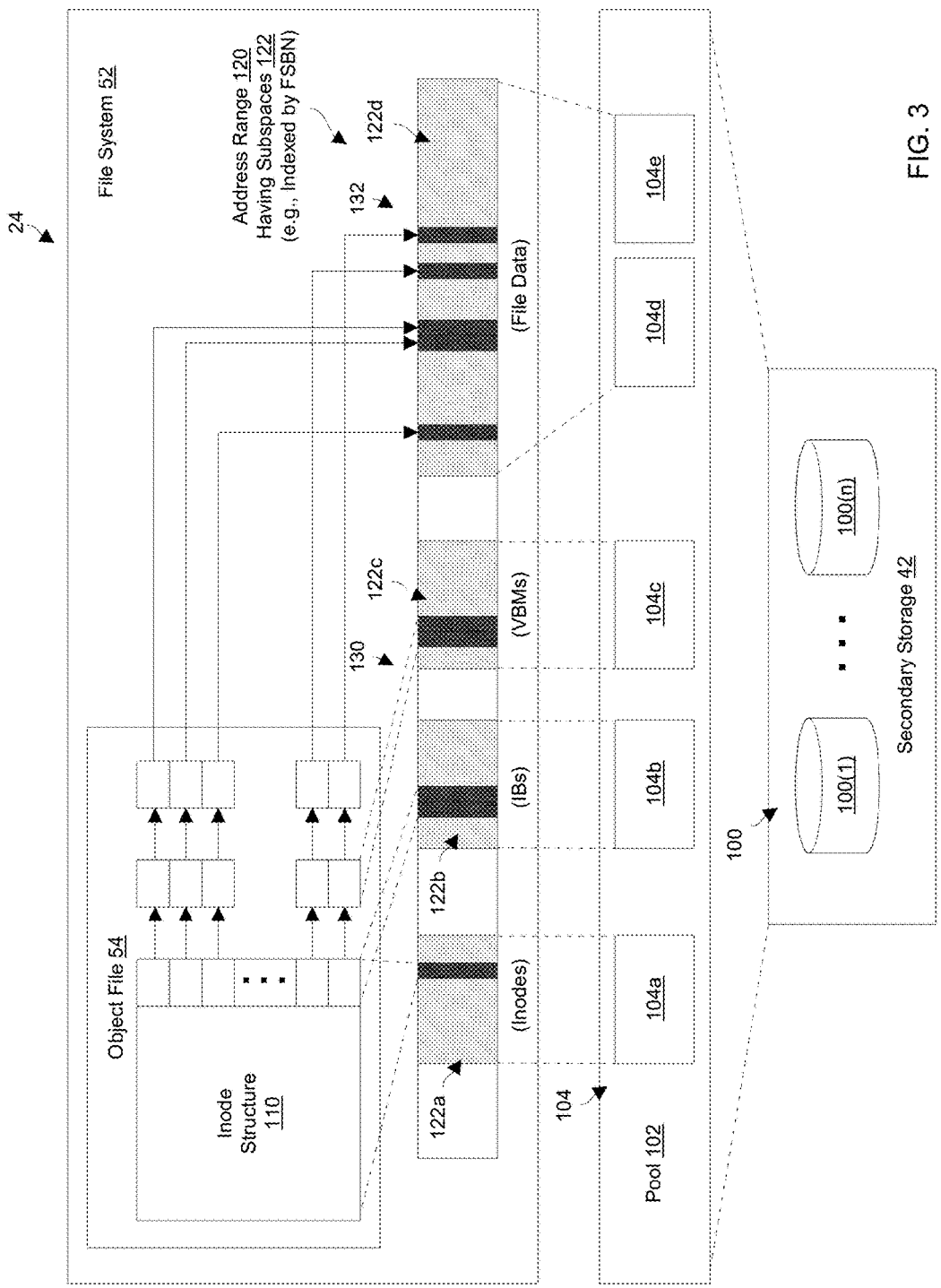
FIG. 3 is a block diagram illustrating particular memory space details of the electronic apparatus of FIG. 2.

FIG. 3 shows particular details of the data storage equipment 24. In particular, the secondary storage 42 (FIG. 1) includes a set of storage devices 100(1), . . . 100(n) (collectively, storage devices 100) which provides a pool 102 of slices 104 for storing data. Each slice 104 is a relatively large chunk of storage that is capable of holding many blocks of data. In some arrangements, the slices 104 are derived from FLUs (Flare LUNs).

In certain arrangements, the secondary storage 42 includes multiple storage tiers. For example, the secondary storage 42 may include a fast tier of flash memory, a medium tier of serial attached SCSI (SAS) drives, and a slower tier of near line SAS drives, etc.

As shown in FIG. 3, the pool 102 of slices 104 stores a file system 52. Files 54 of the file system 52 can be presented to the host computers 22 (FIG. 1) as various types of host-accessible objects, e.g., LUNs, host file systems (HFSs), VVols, etc. In some arrangements, a host file system (or upper deck file system) is contained within a file 54 of the file system 52 (i.e., a lower deck file system).

As further shown in FIG. 3, an example object file 54 includes an inode structure 110 that stores information about the object file 54. The inode structure 110 includes an inode as well as any indirect blocks (IBs) needed to address data of the object file 54.

The file system 52 is seen to have an address range 120 having subspaces 122, and can be indexed, for example, by FSBN (file system block number), where each FSBN ranges from zero to some large number. In the example shown, the subspaces 122 of the address range 120 are referenced as subspaces 122a through 122d, which are supported by respective sets of slices 104 served from the storage pool 102. Subspaces 122a through 122c are reserved for metadata 130, whereas subspace 122d is reserved for file data 132. In this example, Subspace 122a is reserved for inodes and is backed by slice 104a.
Subspace 122b is reserved for indirect blocks (IBs) and is backed by slice 104b.
Subspace 122c is reserved for VBMs (Virtual Block Maps) and is backed by slice 104c.
Subspace 122d is reserved for file data 132 and is backed by slices 104d and 104e.

Although each subspace 122 is seen to be supported by an illustrated number of slices 104, it is understood that each subspace 122 may be supported by any number of slices 104. Also, the file system 52 may include different subspaces 122 from those shown (i.e., the example is merely illustrative).

A file system architecture which is similar to that described above is provided in U.S. application Ser. No. 14/576,931 which was filed on Dec. 19, 2014 and entitled "PERSISTENT METADATA CACHE", the contents and teachings of which are hereby incorporated by reference in their entirety. Further details will now be provided with reference to FIG. 4.

Figure 4:
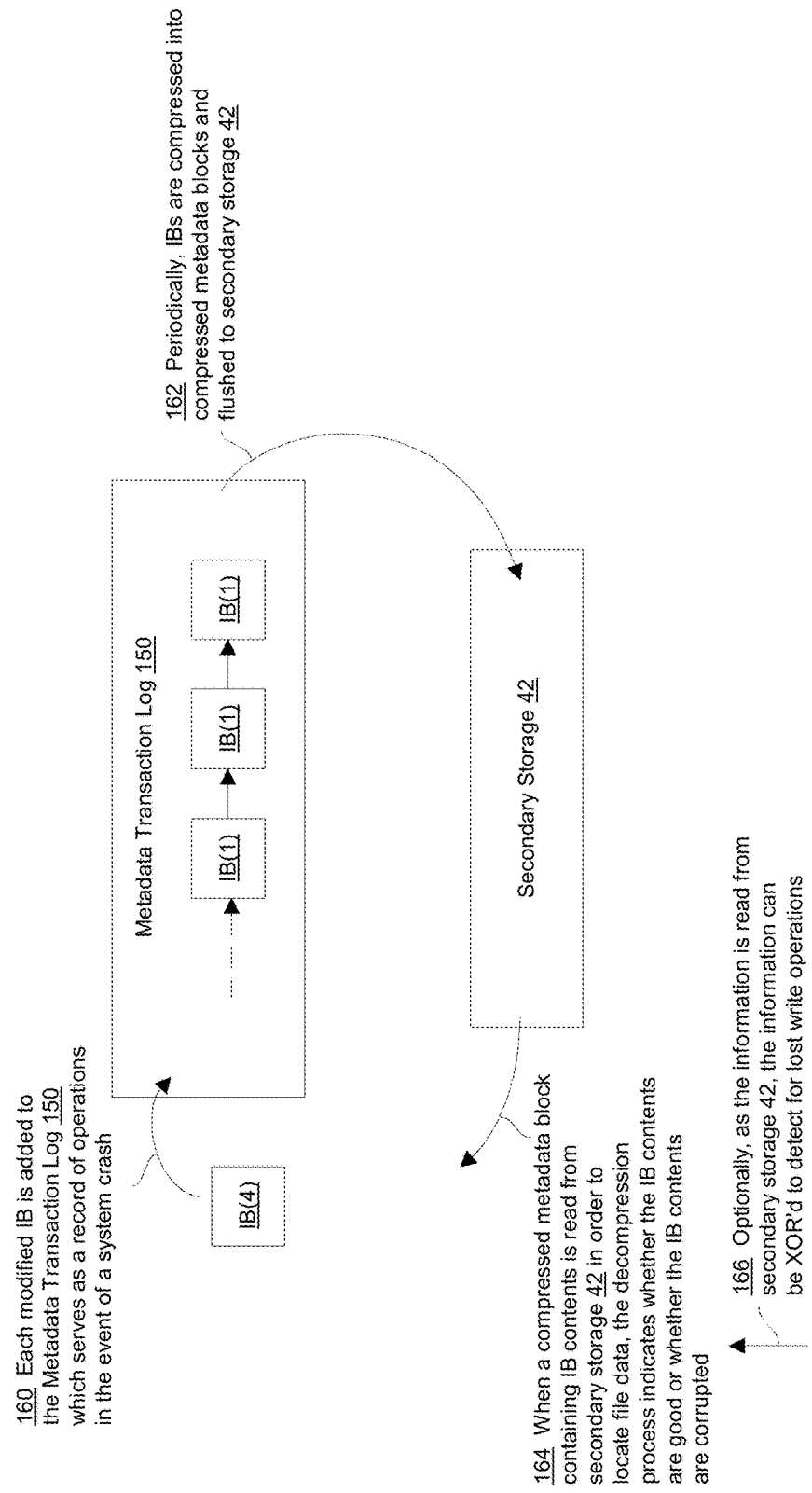
FIG. 4 is a block diagram illustrating particular operating details of the electronic apparatus of FIG. 2.

FIG. 4 shows particular operating details of the data storage equipment 24. In particular, such operation is performed routinely by the specialized circuitry which is formed by the processing circuitry 66 executing the specialized code 72 (also see FIG. 2).

Such operation involves the use of a metadata transaction log 150 which is persistently stored in the memory 64 (also see the cache space 76 in FIG. 2). Such memory 64 may be volatile memory (e.g., RAM) which is backed up by batteries and mirrored (e.g., to a similar cache maintained on another circuit board or storage processing device). As mentioned earlier, the metadata transaction log 150 may serve as a record of operations that have been recently completed by the data storage equipment 24. Since the metadata transaction log 150 may consume expensive computerized resources (e.g., high speed persistent cache memory), the amount of memory space for the metadata transaction log 150 is limited.

At 160, the specialized circuitry of the data storage equipment 24 adds each modified indirect block (IB) of the file system 52 to the metadata transaction log 150. Such operation serves to record operations that have been completed recently by the data storage equipment 24.

At 162, the specialized circuitry periodically flushes dirty entries from the metadata transaction log 150 to the secondary storage 42 to make space for new entries (e.g., every 30 seconds, every minute, etc.). That is, since the metadata transaction log 150 consumes expensive computerized resources (e.g., high speed persistent cache memory), the amount of memory space for the metadata transaction log 150 is finite. If the metadata transaction log 150 were to become full, the data storage equipment 24 would not be able to properly process further data storage operations. When removing entries from the metadata transaction log 150, the specialized circuitry performs a compression operation to compress one or more IBs into a compressed metadata block and flushes that compressed metadata block to the secondary storage 42. It should be understood that the frequency of flushes can be set based on the amount of memory space available and the speed at which entries are added to the metadata transaction log 150.

At 164, when the specialized circuitry needs to locate data using IB contents that were flushed to the secondary storage 42, the specialized circuitry reads the compressed metadata block from the secondary storage 42 and performs a decompression operation. At this time, the specialized circuitry is able to determine whether the IB contents are good or whether the IB contents are corrupted. In some arrangements, the specialized circuitry evaluates a result of the decompression operation to determine whether the IB contents are intact. In other arrangements, the specialized circuitry performs an XOR operation across a storage stripe (i.e., corresponding blocks of data and parity) to verify the data. In some arrangements, the specialized circuitry performs both error detection/correction via decompression as well as an XOR operation. Such processing enables the specialized circuitry to discover whether a write operation has been lost.

At this point, it should be understood that IBs can be safely synchronized to the secondary storage 42 without any need of writing checksums of the IBs to BMDs. Accordingly, there is no need to further consume the metadata transaction log 150 with BMDs to store the IB checksums. Additionally, if the compressed metadata is written to flash memory, there is less wear of the flash memory since BMDs are not updated. Further details will now be provided with reference to FIG. 5.

Figure 5:
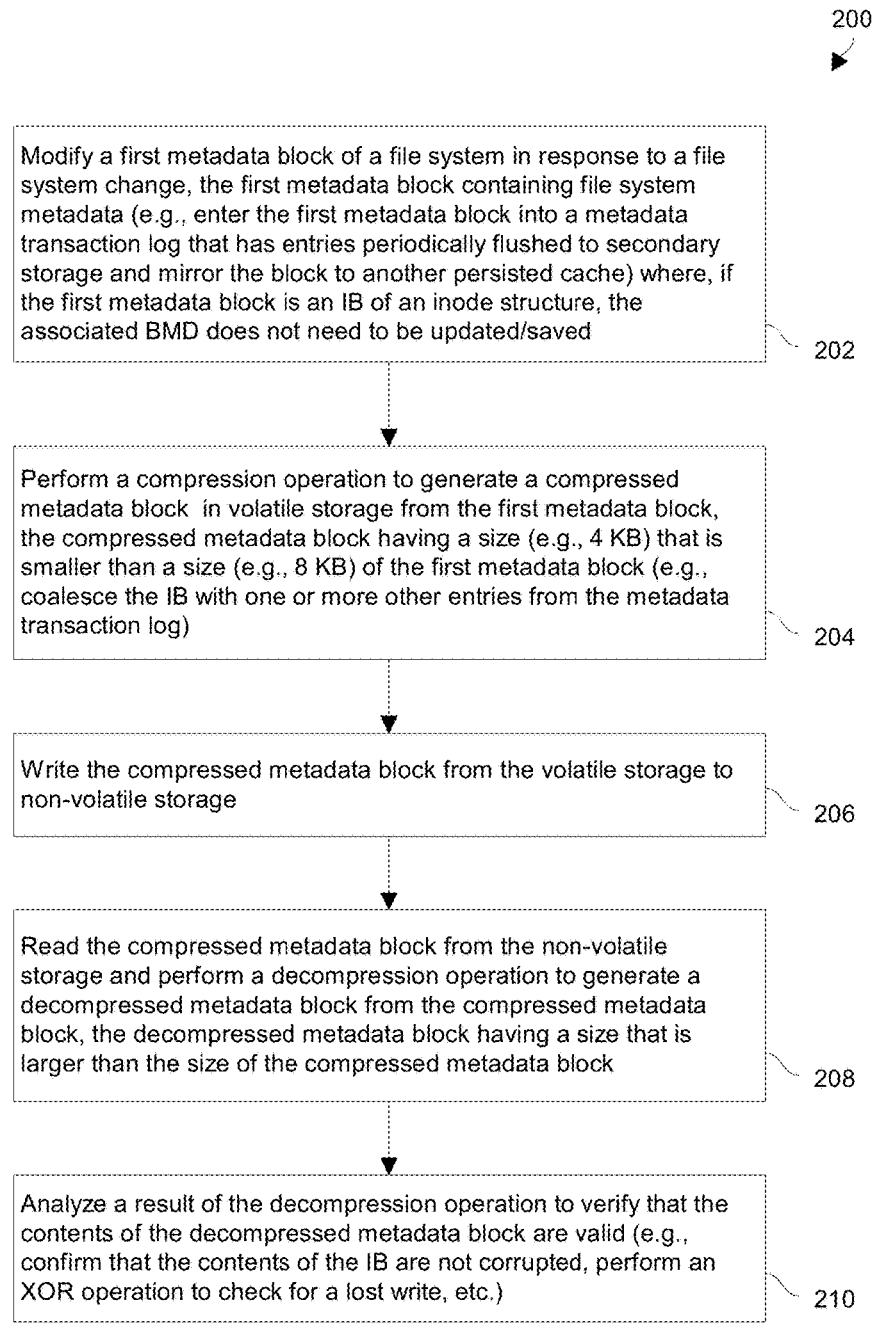
FIG. 5 is a flowchart of a procedure which is performed by the electronic apparatus of FIG. 2.

FIG. 5 is a flowchart of a procedure 200 which is performed by the data storage equipment 24 when managing file system metadata. In particular, such operation compresses metadata blocks (e.g., IBs of inode structures) prior to writing the metadata blocks out to secondary storage thus alleviating the need to store checksums in associated BMDs.

At 202, the data storage equipment 24 modifies a first metadata block of the file system in response to a file system change, the first metadata block containing file system metadata. In particular, the data storage equipment 24 enters the first metadata block into a metadata transaction log from which dirty metadata blocks are periodically flushed to non-volatile storage (e.g., flash memory). Here, if the first metadata block is an IB having an associated BMD, the checksum of the IB does not need to be saved in the BMD and thus the BMD does not need to be updated and saved.

At 204, the data storage equipment 24 performs a compression operation to generate a compressed metadata block in volatile storage from the first metadata block, the compressed metadata block having a size that is smaller than a size of the first metadata block. Here, as part of a flush operation which flushes dirty metadata blocks of the metadata transaction log to the non-volatile storage, the data storage equipment 24 applies a compression algorithm. In some arrangements, the IB which is originally 8 KB in size and is compressed to 4 KB in size (e.g., with zero padding up to the 4 KB size). In such arrangements, compression to 2 KB may be avoided so as not to trigger excessive garbage collection (e.g., where the system attempts to coalesce smaller blocks of data to remove significantly underutilized extents).

At 206, the data storage equipment 24 writes the compressed metadata block from the volatile storage to non-volatile storage (e.g., see the secondary storage 42 in FIG. 1). Since the data being written is filesystem metadata which may be frequently accessed, the data is likely to be written to flash memory (i.e., the highest storage tier). Since BMDs are updated and written in tandem with IBs, there is less flash memory wear.

At 208, the data storage equipment 24 reads the compressed metadata block from the non-volatile storage, and performs a decompression operation to generate a decompressed metadata block from the compressed metadata block, the decompressed metadata block having a size that is larger than the size of the compressed metadata block.

At 210, the data storage equipment 24 analyzes a result of the decompression operation to verify that contents of the decompressed metadata block are valid. Here, the data storage equipment 24 can analyze the decompression result to confirm that the metadata is not corrupted. Also, when the compressed metadata is stored in flash memory, the data storage equipment 24 can perform an XOR operation on striped data to detect for a possible lost write operation since an XOR operation from data in flash memory is extremely quick.

As described above, improved techniques are directed to compressing metadata blocks prior to writing the metadata blocks out to secondary storage 42 when updating a file system 52 with changes. Such techniques alleviate the need to store checksums in BMDs since verification of metadata block contents (e.g., CRC protection) can be taken care of during decompression (i.e., confirmation of correct decompression further indicates that the metadata block contents are intact/good). Accordingly, there are less computerized resources consumed and less wear of flash memory.

One should appreciate that the above-described techniques do not merely compress data in an abstract sense. Rather, the disclosed techniques involve compressing metadata block prior to flushing the metadata blocks from a metadata transaction log. With such techniques, other advantages are available as well such as consuming less space in the metadata transaction log (e.g., no need to update BMDs with checksums), writing less information to secondary storage (e.g., no need to write the BMDs and thus placing less wear on flash memory), less contention on file system data structures and other resources, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, in some arrangements, it should be understood that IBs were described above by way of example only as the filesystem metadata which is compressed. Any filesystem metadata that is stored in flash memory (i.e., on the highest tier) can be compressed thus reducing load on the storage subsystem and minimizing flash wear. Such operation alleviates the need to update BMD since decompression will act as an "internal crc" of the metadata at read time.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. In a data storage system that maintains a file system on behalf of a set of host computers, a method of managing file system metadata, the method comprising:
    modifying file system data of the file system in response to a file system change;
    providing an initial metadata block containing a copy of the modified file system data;
    performing a compression operation on the initial metadata block to generate a compressed metadata block in volatile storage, the compressed metadata block having a size that is smaller than a size of the initial metadata block;
    writing the compressed metadata block from the volatile storage to non-volatile storage;
    reading the compressed metadata block from the non-volatile storage;
    performing a decompression operation on the compressed metadata block to generate a decompressed metadata block, the decompressed metadata block having a size that is larger than the size of the compressed metadata block;
    performing one or more of an error detection operation and an error correction operation while performing one or more of the compression operation and the decompression operation to obtain confirmation results pertaining to correct decompression of the compressed metadata block; and
    verifying that contents of the decompressed metadata block are valid based on the confirmation results, thereby avoiding storage of a checksum for validating the contents of the decompressed metadata block.

2. A method as in claim 1 further comprising:
    entering the initial metadata block into a metadata transaction log from which dirty metadata blocks are periodically flushed to the non-volatile storage.

3. A method as in claim 2 wherein performing the compression operation to generate the compressed metadata block in the volatile storage from the initial metadata block includes:
    as part of a flush operation which flushes dirty metadata blocks of the metadata transaction log to the non-volatile storage, applying a compression algorithm to the initial metadata block to form the compressed metadata block.

4. A method as in claim 1 wherein the file system data includes an inode structure,
    wherein the modifying of the file system data includes modifying the inode structure in response to the file system change, and wherein the providing of the initial metadata block includes providing the initial metadata block containing a copy of the modified inode structure.

5. A method as in claim 4 wherein the performing of the compression operation includes performing the compression operation on the copy of the modified inode structure, the compressed metadata block including a compressed copy of the modified inode structure, and
wherein the performing of the decompression operation includes performing the decompression operation on the compressed copy of the modified inode structure.

6. In a data storage system that maintains a file system on behalf of a set of host computers, a method of managing file system metadata, the method comprising:
modifying a first metadata block of the file system in response to a file system change, the first metadata block containing file system metadata;
performing a compression operation to generate a compressed metadata block in volatile storage from the first metadata block, the compressed metadata block having a size that is smaller than a size of the first metadata block;
writing the compressed metadata block from the volatile storage to non-volatile storage;
reading the compressed metadata block from the non-volatile storage;
performing a decompression operation to generate a decompressed metadata block from the compressed metadata block, the decompressed metadata block having a size that is larger than the size of the compressed metadata block; and
analyzing a result of the decompression operation to verify that contents of the decompressed metadata block are valid,
wherein modifying the first metadata block includes:
entering the first metadata block into a metadata transaction log from which dirty metadata blocks are periodically flushed to the non-volatile storage,
wherein performing the compression operation to generate the compressed metadata block in the volatile storage from the first metadata block includes:
as part of a flush operation which flushes dirty metadata blocks of the metadata transaction log to the non-volatile storage, applying a compression algorithm to the first metadata block to form the compressed metadata block,
wherein the first metadata block is an indirect block (IB) of an inode structure of the file system,
wherein a respective metadata block (BMD) contains additional metadata associated with the IB, and
wherein entering the first metadata block into the metadata transaction log includes adding the IB to the metadata transaction log without updating the BMD and without adding the BMD to the metadata transaction log.

7. A method as in claim 6 wherein the IB is 8 KB in size; and
wherein the compressed metadata block is 4 KB in size.

8. A method as in claim 6 wherein the flush operation (i) coalesces the IB with other compressed metadata blocks into an extent for synchronization to flash memory and (ii) writes the extent to the flash memory.

9. A method as in claim 6 wherein the metadata transaction log resides in first volatile cache memory; and wherein adding the IB to the metadata transaction log includes:
placing the IB in the metadata transaction log residing in the first volatile cache memory and placing a copy of the IB in second volatile cache memory which mirrors the first volatile cache memory.

10. A method as in claim 6 wherein writing the compressed metadata block from the volatile storage to the non-volatile storage includes writing a particular extent to the non-volatile storage, the extent including the IB; and
wherein the method further comprises:
in response to another file system change, reading a group of extents from the non-volatile storage, the group of extents including the particular extent, and performing an XOR operation on the group of extents to determine whether the IB was involved in a lost write operation.

11. Data storage equipment that maintains a file system on behalf of a set of host computers, the data storage equipment comprising:
a communications interface which is constructed and arrange to communicate with the set of host computers;
memory which includes volatile storage and non-volatile storage; and
control circuitry coupled to the communications interface and the memory, the memory storing instructions which, when carried out by the control circuitry, cause the control circuitry to:
modify file system data of the file system in response to a file system change;
provide an initial metadata block containing a copy of the modified file system data,
perform a compression operation on the initial metadata block to generate a compressed metadata block in the volatile storage, the compressed metadata block having a size that is smaller than a size of the initial metadata block;
write the compressed metadata block from the volatile storage to the non-volatile storage;
read the compressed metadata block from the non-volatile storage;
perform a decompression operation on the compressed metadata block to generate a decompressed metadata block, the decompressed metadata block having a size that is larger than the size of the compressed metadata block;
perform one or more of an error detection operation and an error correction operation while performing one or more of the compression operation and the decompression operation to obtain confirmation results pertaining to correct decompression of the compressed metadata block; and
verify that contents of the decompressed metadata block are valid based on the confirmation results, thereby avoiding storage of a checksum for validating the contents of the decompressed metadata block.

12. Data storage equipment as in claim 11 wherein the instructions, when carried out by the control circuitry, further cause the control circuitry to:
enter the initial metadata block into a metadata transaction log from which dirty metadata blocks are periodically flushed to the non-volatile storage.

13. Data storage equipment as in claim 12 wherein the instructions, when carried out by the control circuitry, further cause the control circuitry to:
as part of a flush operation which flushes dirty metadata blocks of the metadata transaction log to the non-volatile storage, apply a compression algorithm to the initial metadata block to form the compressed metadata block.

14. A computer program product having a non-transitory computer readable medium which stores a set of instructions to manage file system metadata in a data storage system that maintains a file system on behalf of a set of host computers, the set of instructions, when carried out by computerized circuitry, causing the computerized circuitry to perform a method of:
   modifying file system data of the file system in response to a file system change;
   providing an initial metadata block containing a copy of the modified file system data;
   performing a compression operation on the initial metadata block to generate a compressed metadata block in volatile storage, the compressed metadata block having a size that is smaller than a size of the initial metadata block;
   writing the compressed metadata block from the volatile storage to non-volatile storage;
   reading the compressed metadata block from the non-volatile storage;
   performing a decompression operation on the compressed metadata block to generate a decompressed metadata block, the decompressed metadata block having a size that is larger than the size of the compressed metadata block;
   performing one or more of an error detection operation and an error correction operation while performing one or more of the compression operation and the decompression operation to obtain confirmation results pertaining to correct decompression of the compressed metadata block; and
   verifying that contents of the decompressed metadata block are valid based on the confirmation results, thereby avoiding storage of a checksum for validating the contents of the decompressed metadata block.

15. A computer program product as in claim 14 wherein the method further comprises:
   entering the initial metadata block into a metadata transaction log from which dirty metadata blocks are periodically flushed to the non-volatile storage; and
   wherein performing the compression operation on the initial metadata block to generate the compressed metadata block in the volatile storage includes:
      as part of a flush operation which flushes dirty metadata blocks of the metadata transaction log to the non-volatile storage, applying a compression algorithm to the initial metadata block to form the compressed metadata block.

16. A computer program product having a non-transitory computer readable medium which stores a set of instructions to manage file system metadata in a data storage system that maintains a file system on behalf of a set of host computers, the set of instructions, when carried out by computerized circuitry, causing the computerized circuitry to perform a method of:
   modifying a first metadata block of the file system in response to a file system change, the first metadata block containing file system metadata;
   performing a compression operation to generate a compressed metadata block in volatile storage from the first metadata block, the compressed metadata block having a size that is smaller than a size of the first metadata block;
   writing the compressed metadata block from the volatile storage to non-volatile storage;
   reading the compressed metadata block from the non-volatile storage;
   performing a decompression operation to generate a decompressed metadata block from the compressed metadata block, the decompressed metadata block having a size that is larger than the size of the compressed metadata block; and
   analyzing a result of the decompression operation to verify that contents of the decompressed metadata block are valid,
   wherein modifying the first metadata block includes:
      entering the first metadata block into a metadata transaction log from which dirty metadata blocks are periodically flushed to the non-volatile storage,
   wherein performing the compression operation to generate the compressed metadata block in the volatile storage from the first metadata block includes:
      as part of a flush operation which flushes dirty metadata blocks of the metadata transaction log to the non-volatile storage, applying a compression algorithm to the first metadata block to form the compressed metadata block,
   wherein the first metadata block is an indirect block (IB) of an inode structure of the file system,
   wherein a respective metadata block (BMD) contains additional metadata associated with the IB, and
   wherein entering the first metadata block into the metadata transaction log includes adding the IB to the metadata transaction log without updating the BMD and without adding the BMD to the metadata transaction log.

17. A computer program product as in claim 16 wherein the IB is 8 KB in size;
   wherein the compressed metadata block is 4 KB in size;
   wherein the flush operation (i) coalesces the IB with other compressed metadata blocks into an extent for synchronization to flash memory and (ii) writes the extent to the flash memory;
   wherein the metadata transaction log resides in first volatile cache memory;
   wherein adding the IB to the metadata transaction log includes:
      placing the IB in the metadata transaction log residing in the first volatile cache memory and placing a copy of the IB in second volatile cache memory which mirrors the first volatile cache memory;
   wherein writing the compressed metadata block from the volatile storage to the non-volatile storage includes writing a particular extent to the non-volatile storage, the extent including the IB; and
   wherein the method further comprises:
      in response to another file system change, reading a group of extents from the non-volatile storage, the group of extents including the particular extent, and performing an XOR operation on the group of extents to determine whether the IB was involved in a lost write operation.

* * * * *